J. F. KITCHEN.

MACHINE FOR FORMING WIRE STAYS.

APPLICATION FILED MAR. 2, 1915.

Reissued Apr. 27, 1915.

13,904.

2 SHEETS—SHEET 1.

WITNESSES

W. T. Holman

Elbert L. Hyde

INVENTOR

John F. Kitchen.

By Frederick H. Winter

Attorney

THE NORRIS PETERS CO., PHOTO-LITHO., WASHINGTON, D. C.

J. F. KITCHEN.

MACHINE FOR FORMING WIRE STAYS.

APPLICATION FILED MAR. 2, 1915.

Reissued Apr. 27, 1915.

13,904.

2 SHEETS—SHEET 2.

WITNESSES

W. T. Holman

Elbert L. Hyde.

INVENTOR

John F. Kitchen,

By Frederick H. Winter

Attorney.

THE NORRIS PETERS CO., PHOTO-LITHO., WASHINGTON, D. C.

UNITED STATES PATENT OFFICE.

JOHN F. KITCHEN, OF MEADVILLE, PENNSYLVANIA, ASSIGNOR TO THE SPIRELLA COMPANY, OF MEADVILLE, PENNSYLVANIA, A CORPORATION OF PENNSYLVANIA.

MACHINE FOR FORMING WIRE STAYS.

13,904. Specification of Reissued Letters Patent. Reissued Apr. 27, 1915.

Original No. 1,118,019, dated November 24, 1914, Serial No. 711,512. Application for reissue filed March 2, 1915. Serial No. 11,624.

*To all whom it may concern:*

Be it known that I, JOHN F. KITCHEN, a resident of Meadville in the county of Crawford and State of Pennsylvania, have invented a new and useful Improvement in Machines for Forming Wire Stays, of which the following is a specification.

This invention relates to wire bending machines and particularly to machines for bending wire back and forth into sinuous form to form a flat wire fabric suitable for use as a corset stay. The object of the invention is to provide an improved wire bending machine embodying loop-forming pins around which the wire is bent by a single wire guiding and bending member movable transversely to the path of movement of the finished stay as it issues from the machine and located on the opposite side of the loop-forming pins from the completed stay fabric. A further object of the invention is to provide a machine of this kind having various adjustments to enable the stay to be produced with different amounts of overlap between successive loops, with the loops at various angles of inclination to the general plane of the stay, and for other reasons, as more fully hereinafter set forth.

The invention comprises the construction and arrangement of parts hereinafter described and claimed.

Figures 1, 3, 4:
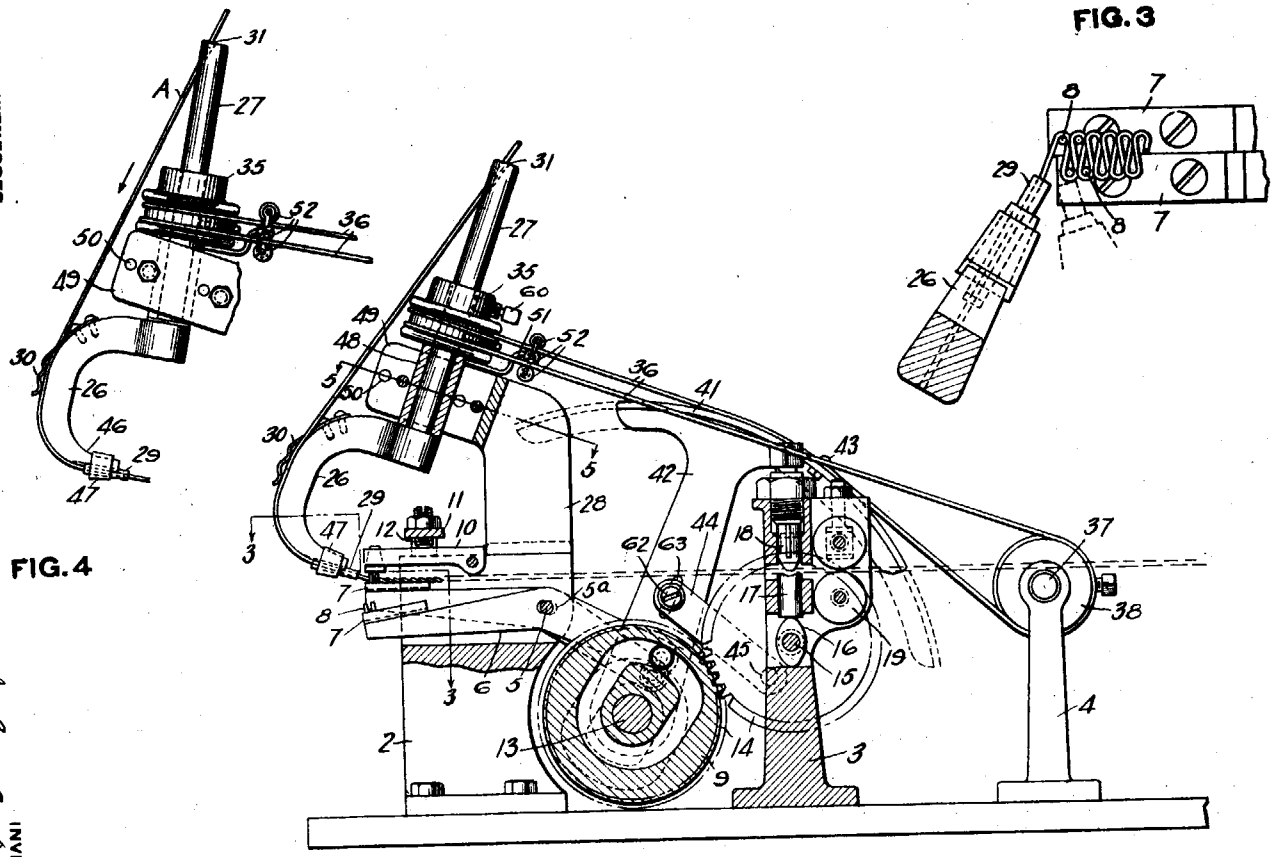
Figure 2:
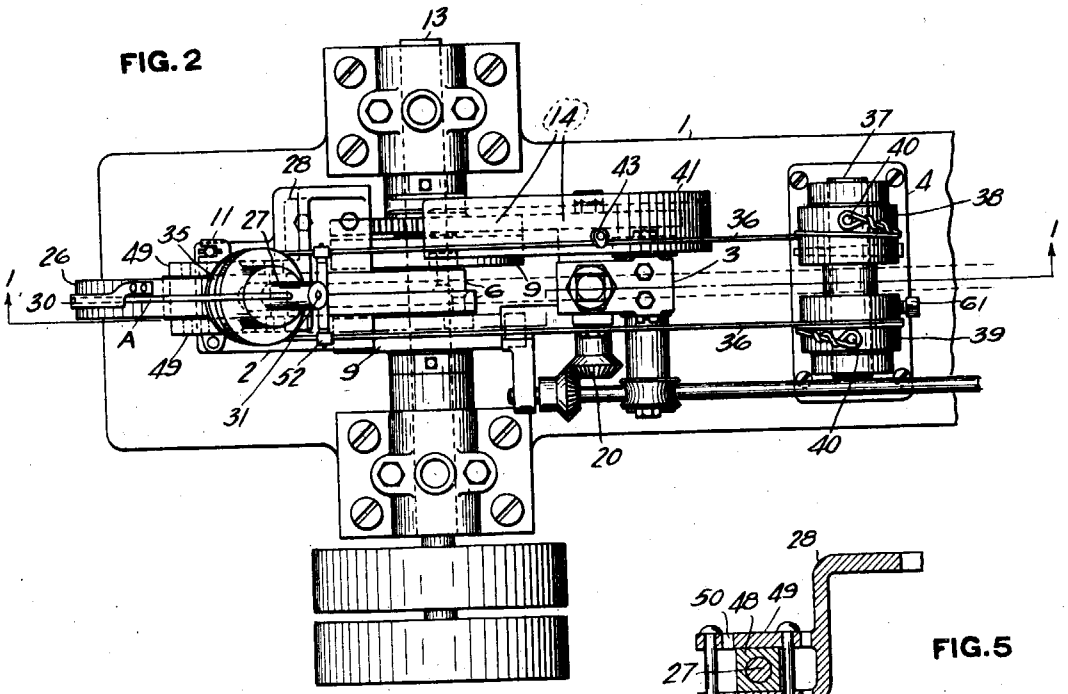
Figure 5:
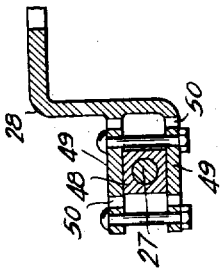

In the accompanying drawings, Figure 1 is a side elevation, partly in section, on the line 1—1, Fig. 2, of a machine constructed according to my invention; Fig. 2 is a plan view of the same; Fig. 3 is a horizontal section on the line 3—3, Fig. 1; Fig. 4 is a detail elevation, illustrating the bender arm and shaft adjusted to a different position from that illustrated in Fig. 1; and Fig. 5 is a detail section on the line 5—5, Fig. 1.

The machine is provided with a suitable base or support 1 provided with standards 2, 3 and 4 to support the various parts of the mechanism. Upon a transverse shaft 5 in the standard 2 are fulcrumed two levers 6 carrying pin blocks 7 on which are mounted pins 8 around which the wire is coiled in the formation of the stay, said levers being operated by cams 9 carried by the main driving shaft 13. The holes in the levers 6, through which the fulcrum 5 passes, are slightly elongated to form slots 5ª to allow said levers to have a slight longitudinal movement in addition to their oscillating movement on the pivot bar 5. Above the pin blocks 7 and coöperating therewith is a presser foot 10, pivotally supported at one end in the standard 2 and, at its other end, resting upon the upper face of the stay as it is coiled around the pins 8. This presser foot is held rigidly in contact with the stay being formed by means of a cross bar 11 and an adjusting screw 12 bearing against the presser foot. The main shaft 13 of the machine, which is suitably driven, as by belt pulleys or the like, is connected by gears 14 to a second shaft 15 rotatable in the standard 3 and carrying an oval cam 16 arranged to reciprocate a sliding hammer 17, which coöperates with an adjustable fixed hammer 18 to straighten the stay after it is formed and take the curvature out of the same. In the same standard 3 are mounted a pair of feeding rollers 19 which are geared to rotate in unison, and one of which is driven through suitable gearing by a gear 20 on the shaft 15.

The machine described so far is substantially the same as that shown in the Patent No. 1,009,823, granted November 28, 1911, to Marcus M. Beeman, and operates in substantially the same manner.

One of the principal features of the present machine is the arrangement of the wire guiding and bending member which, in the particular machine shown, is located in advance of the loop-forming pins and on the opposite side thereof from the completed stay fabric, which leaves the machine behind said pins, and which bending member is arranged to oscillate back and forth from side to side of the machine about an axis preferably located in the vertical median plane of the machine. The oscillating bending member comprises a hook-shaped yoke or arm 26 secured to the lower end of shaft 27 which is rotatably mounted in a standard 28 secured to or forming part of the standard 2. At its lower end the yoke 26 is provided with a hollow tubular hardened steel nose 29 through which the wire is led and by which it is bent around the loop-forming pins 8. A suitable tension device, shown as a flat leaf spring 30, is mounted upon the arm 26 to retard the wire as it is fed to the loop-forming pins. Preferably, the wire is supplied to the bender from a spool supported above the machine and from which the wire is led through a slot or opening 31 in the shaft 27 to the tension device 30.

The combined guide and bender 26 may be oscillated back and forth to bend the wire around the loop-forming pins 8 by any suitable means, for example, a sheave or pulley 35 fixed to the shaft 27 and around which are coiled several turns of a flexible driving member 36 suitably secured at a median point to the sheave, and which may be either a wire, cord, chain, band or like device. The flexible driving member is connected to a shaft 37 rotatable in suitable bearings in the standard 4 and carrying a pair of sheaves or pulleys 38 and 39, several turns of the opposite ends or strands of the flexible driving member 36 being coiled around said sheaves in opposite directions, as shown in Fig. 2, and being also suitably secured thereto, as at 40. Suitable means is connected to one strand of the driving member 36 between the sheaves 38 and 39 and the sheave 35 to rotate the sheave 35 alternately in opposite directions. In the embodiment shown this comprises a smooth segment 41 carried by an arm 42 which is mounted upon and oscillates around the shaft 13, one strand of the member 36 being fixedly secured to the segment as at 43. The arm 42 is oscillated back and forth by a link 44 pivotally connected thereto at one end, as at 62, and which, at its other end, is connected to an eccentric or crank pin 45 mounted upon the gear 14 on the shaft 15. Rotation of the shaft 15 oscillates the arm 42 back and forth and rotates the sheave 35 and shaft 27 alternately in opposite directions. Thus when the arm 42 moves toward the shaft 27, it unwinds the driving cord 36 from the sheave 38 and rotates the shaft 37. The rotation of this shaft winds the other strand of the cord 36 upon the sheave 39 and thus rotates the sheave 35 in one direction. When the arm 42 moves in the other direction it rotates the sheave 35 in the opposite direction and this in turn unwinds the cord 36 from the sheave 39 and winds up its other end upon the sheave 38.

The operation of the machine is as follows: The wire A passes through the slot 31 and under the tension device 30 and through the guide and bender nose 29 to the pin blocks 7, and is looped around the forward pin 8 of the block which is in the elevated position, where it is clamped tightly in place between said block and the presser foot 10. The shaft 27 is then rotated by the mechanism described to swing the bender nose 29 toward that side of the machine on which the pin block is depressed. If its amplitude of swing is sufficient it carries the wire across over the depressed pin block and underneath a previously formed loop on the other side of the machine. The depressed pin block then ascends and catches the wire which was carried transversely between its two loop-forming pins 8 and clamps it tightly against the presser foot 10, one of the pins 8 entering a previously formed loop or eye. After this pin block has fully ascended the other pin block descends and the mechanism described then causes the bender 29 to swing toward the other side of the machine and carries the wire back across and over the now lowered pin block and under a previously formed loop on that side of the machine, thus finishing one complete cycle of operation of the machine. It will of course be understood that simultaneously with its formation the wire fabric is fed through the machine in the same manner and by the same means as in the prior Beeman patent referred to.

By referring to Fig. 1 it will be observed that the end of the hollow tubular nose 29 is located a short distance from the axis of the shaft 27, thereby causing the open end of the hollow nose, during rotation or oscillation of the shaft, to swing around the axis of the shaft and from side to side of the machine. Preferably, this distance is substantially the same or a little more than the length of one of the crossings or transverse portions of the finished stay.

In order to enable the hollow nose to be readily replaced when worn it is made separate and detachable. In the embodiment shown the end 46 of the yoke 26 is tapered or conical and the tube 29 is held in a groove in the yoke by a tapered or conical sleeve 47 which is forced endwise onto the end of the yoke to rigidly clamp the tube in place. By loosening the sleeve 47 from the end of the yoke the tube may also be adjusted endwise in its slot to vary the distance between its open end and the axis around which the swinging bender oscillates.

The present machine is also so constructed that the swinging bender or guide may be adjusted to oscillate around any point near the loop-forming pins 8 and with varying amplitude of oscillation. The axis or shaft 27, as illustrated in Fig. 1, is in the median plane of the machine and is also inclined to the general plane of the stay being formed or to that of the pin-carrying blocks. This causes the wire to be bent around the pins 8 at an inclination to the general plane of the stay and permits successive loops or eyes to be pushed under each other to overlap, giving the finished stay a "shingled" appearance when viewed edgewise, as in Fig. 1. The angle of inclination of the shaft 27 and the amount of tilt thereby given to the loops may be varied, and for this purpose the shaft 27 is adjustably mounted in any suitable manner in the bracket or standard 28 supporting the same. In the embodiment shown the shaft 27 rotates in a bearing member 48, having flat sides suitably clamped or rigidly held between a pair of arms 49 formed on the upper end of the bracket 28. These arms are provided with a number of oppositely disposed pairs of apertures 50 therein, through which suitable clamping bolts may be passed to secure the bearing member 48 in adjusted position. To vary the tilting of the loops with respect to each other, the bearing member 48 is bodily moved between the arms 49 and is securely clamped in a position giving the proper inclination of the shaft 27 with respect to the general plane of the stay.

The amount of overlap of successive loops upon each other may be varied by changing the relative distances between the pins 8 and also varying the amplitude of oscillation of the bender 26 to cause it to swing in a longer or shorter path and therefore push the wire more or less under the previously formed loops. This may be accomplished by suitably varying the amplitude of oscillation of the arm 42 and the segment or sector 41 which operate the shaft 27. In the form shown, the pivot 62, connecting the link 44 which oscillates arm 42 is adjustable in a radial slot 63 therein, thus varying the throw of the arm.

The bearing member 48 which supports the shaft 27 may be adjusted in all directions in the vertical median plane of the machine. Consequently, the swinging bender 26 and shaft 27 may be adjusted in a straight line longitudinally of the shaft, whereby the bender may be properly aligned vertically with respect to the stay being formed. This adjustment also permits the tubular nose 29 to be so located, with respect to the stay being formed, as to reduce to a minimum the friction of the wire thereon as it is fed to and bent around the loop-forming pins.

The same construction above described permits the bearing member 48 to be bodily adjusted horizontally in the machine without varying the inclination of shaft 27 to the horizontal, thereby securing proper registration of the wire, while being bent, with the spaces between successive pins 8.

Under some circumstances it is desirable to have the bending member swing more to one side of the central median plane of the machine than to the other side thereof, as in producing a non-symmetrical stay. For this purpose the sheave 35 is rotatably adjustable on the axis or shaft 27, a set-screw or other clamping means 60 being provided for securing the sheave adjustably upon the shaft. This same adjustment also permits the swing of the bender to be made the same on both sides of the machine.

Both the angular and the horizontal adjustments of the bearing member 48 in the arms 49 alter the position of the sheave 35 with respect to the driving sector 41 and the sheaves 38 and 39. To cause the cord or wire 36 to track or wind properly on the sheaves 35, 38, 39 and sector 41, the bearing member 48 is provided on its rear face with an arm or bracket 51, which carries idle rollers or sheaves 52 located in line with the sheave 35 and forming guides for the cord 36. These rollers 52 move bodily with the bearing member 48 during adjustment thereof and cause the cord 36 to properly track with reference to the sheaves and sector in all positions of the shaft 27. The same adjustments referred to also require variation in the effective length of the driving member 36, and for this purpose one or both of the sheaves 38 and 39 may be rotatably adjustable upon the shaft 37. As illustrated the member 38 is pinned or otherwise non-rotatably secured to the shaft 37, while member 39 is provided with a set-screw 61 to adjustably secure it to the shaft in different positions. The change in length of the flexible driving member 36 between the sector 41 and sheave 35 may be taken care of by a rotative and longitudinal movement of the sheave 35 on the shaft 27.

The machine described is very simple and is not likely to get out of order. The bending member 29 serves both to guide the wire to the pins 8 and to bend it around the same. The various adjustments which may be given to the bender and guide permit the loops or eyes in the finished stay to be formed of any shape or with any proportions and with varying degrees of inclination to the plane of the finished stay and of overlapping one upon another.

Obviously, the machine shown can be operated as well when placed on end or in other positions, as in the position shown, and the terms of description employed herein and referring to the positions of the parts or directions of movement thereof are not to be understood as limiting the invention to the exact position, form, or arrangement of machine shown.

What I claim is:—

1. In a wire bending machine, the combination of two loop-forming pins, carriers therefor arranged to raise and lower the same alternately, and a movable bending member located in advance of said loop-forming pins and arranged to alternately bend the wire first around one pin and then around the other to form a wire fabric, the formed fabric leaving said pins on the side opposite said bending member.

2. In a wire bending machine, the combination of two loop-forming pins, carriers therefor arranged to raise and lower the same alternately, and a movable hollow member through which the wire is fed, said member being located on one side of said pins and being operative to bend said wire back and forth alternately around said pins to form a wire fabric, the completed fabric lying on the opposite side of said pins.

3. In a wire bending machine, the combination of loop-forming pins, carriers therefor arranged to raise and lower the same alternately, and a wire bending member arranged to oscillate around an axis located in advance of said pins and bend the wire alternately around the same to form a wire fabric, the completed wire fabric lying behind said pins.

4. In a wire bending machine, the combination of loop-forming pins, carriers therefor arranged to raise and lower the same alternately, an oscillating bending member having its axis in the median plane of the machine and arranged to alternately bend the wire around said pins, and means for feeding the completed stay fabric away from said pins on the side thereof opposite said bending member.

5. In a wire stay forming machine, the combination of loop-forming pins, carriers therefor arranged to raise and lower the same alternately, and an oscillating bending member having an axis in the central median plane of the machine and inclined to the plane of the finished stay, said member being arranged to oscillate around said axis and alternately bend the wire around said pins.

6. In a wire stay forming machine, the combination of loop-forming pins, carriers therefor arranged to raise and lower the same alternately, an oscillating bending member having an axis in the central median plane of the machine and inclined to the plane of the finished stay, said member being arranged to oscillate around said axis and bend the wire around said pins, and means whereby the inclination of said axis to the plane of the stay may be varied.

7. In a wire bending machine, the combination of loop-forming pins, carriers therefor arranged to raise and lower the same alternately, and an oscillating bending member having its axis in the median line of the machine and arranged to oscillate around said axis and bend the wire around said pins, said member being so mounted as to be bodily adjustable with relation to said pins.

8. In a wire bending machine, the combination of loop-forming pins, carriers therefor arranged to raise and lower the same alternately, an oscillating shaft, an arm on said shaft, and a hollow guide and bender on said arm arranged to swing from side to side of the machine and bend the wire around said pins.

9. In a wire bending machine, the combination of loop-forming pins, carriers therefor arranged to raise and lower the same alternately, an oscillating shaft, an arm on said shaft, a hollow guide and bender on said arm arranged to swing from side to side of the machine and bend the wire around said pins, and means whereby said hollow guide may be adjusted toward and from said pins to vary the distance therebetween.

10. In a wire bending machine, the combination of loop-forming pins, carriers therefor arranged to raise and lower the same alternately, an oscillating bending member having its axis in the median line of the machine and arranged to oscillate around said axis and bend the wire around said pins, means for oscillating said member, and means for varying the amplitude of oscillation of said member.

11. In a wire bending machine, the combination of loop-forming pins, carriers therefor arranged to raise and lower the same alternately, an oscillating shaft, an arm carrying a bender thereon, means for oscillating said shaft, and means whereby said shaft may be adjusted endwise in its support.

12. In a wire bending machine, the combination of loop-forming pins, carriers therefor arranged to raise and lower the same alternately, an oscillating shaft having its axis inclined to the plane of the fabric being formed, an arm carrying a bender thereon, means for oscillating said shaft, and means whereby said shaft may be adjusted endwise in its support.

13. In a wire bending machine, the combination of loop-forming pins, carriers therefor arranged to raise and lower the same alternately, a frame supporting said carriers, a bearing member carried by said frame, an oscillating shaft in said member with its axis inclined to that of the finished article, and means for adjusting said bearing member on said frame to vary said inclination.

14. In a wire bending machine, the combination of loop-forming pins, carriers therefor arranged to raise and lower the same alternately, an oscillating shaft carrying a guide and bender for bending the wire around said pins, a sheave on said shaft, and flexible driving means connected to said sheave and arranged to rotate the same and oscillate said bender from side to side of the machine.

15. In a wire bending machine, the combination of loop-forming pins, carriers therefor arranged to raise and lower the same alternately, an oscillating shaft carrying a guide and bender for bending the wire around said pins, a sheave on said shaft, and flexible driving means connected to said sheave and arranged to rotate the same and oscillate said bender from side to side of the machine, said sheave being rotatably adjustable on said shaft.

16. In a wire bending machine, the combination of loop-forming pins, carriers therefor arranged to raise and lower the same alternately, a shaft carrying a bender arranged to oscillate from side to side of said machine to bend the wire around said pins, a sheave on said shaft, a second shaft, a pair of sheaves thereon, a flexible driving member passing around said pair of sheaves in opposite directions, and means connected to said flexible member for oscillating said bender shaft.

17. In a wire bending machine, the combination of loop-forming pins, carriers therefor arranged to raise and lower the same alternately, a shaft carrying a bender arranged to oscillate from side to side of said machine to bend the wire around said pins, a sheave on said shaft, a second shaft, a pair of sheaves thereon, a flexible driving member passing around said pair of sheaves in opposite directions, means connected to said flexible member for oscillating said bender shaft, means for bodily adjusting said bender shaft to vary the position of said bender with relation to said pins, and means for rotatably adjusting one of said pair of sheaves on said second-named shaft.

In testimony whereof I have hereunto set my hand.

JOHN F. KITCHEN.

Witnesses:
T. F. CHARLTON,
W. S. SMITH.

Copies of this patent may be obtained for five cents each, by addressing the "Commissioner of Patents, Washington, D. C."